United States Patent
Yang et al.

(10) Patent No.: US 9,878,372 B2
(45) Date of Patent: Jan. 30, 2018

(54) MACHINING EQUIPMENT

(71) Applicants: FU DING ELECTRONICAL TECHNOLOGY (JIASHAN) CO., LTD., Zhejiang (CN); HON HAI PRECISION INDUSTRY CO., LTD., New Taipei (TW)

(72) Inventors: Ming-Lu Yang, New Taipei (TW); Yang-Mao Peng, Jiashan (CN); Jian-Shi Jia, Jiashan (CN); Jing-Shuang Sui, Jiashan (CN); Zhen-Guang Xu, Jiashan (CN); Jun Fu, Jiashan (CN)

(73) Assignees: FU DING ELECTRONICAL TECHNOLOGY ( JIASHAN) CO.,LTD., Jiashan (CN); HON HAI PRECISION INDUSTRY CO., LTD., New Taipei (TW)

( * ) Notice: Subject to any disclaimer, the term of this patent is extended or adjusted under 35 U.S.C. 154(b) by 192 days.

(21) Appl. No.: 14/920,898

(22) Filed: Oct. 23, 2015

(65) Prior Publication Data
US 2016/0114403 A1    Apr. 28, 2016

(30) Foreign Application Priority Data
Oct. 28, 2014  (CN) .......................... 2014 1 0585851

(51) Int. Cl.
*B23B 27/10* (2006.01)
*B23B 27/16* (2006.01)

(52) U.S. Cl.
CPC ............ *B23B 27/10* (2013.01); *B23B 27/167* (2013.01); *B23B 2250/12* (2013.01); *Y10T 82/16065* (2015.01); *Y10T 82/2591* (2015.01); *Y10T 407/14* (2015.01)

(58) Field of Classification Search
CPC ... B23B 2250/12; B23B 27/10; B23B 27/167; B23B 27/16; B23B 27/04; B23B 29/02; Y10T 407/14; Y10T 407/2288; Y10T 407/2284; Y10T 407/2282; Y10T 82/2591
See application file for complete search history.

(56) References Cited

U.S. PATENT DOCUMENTS 5,829,331 A * 11/1998 Mori ....................... B23B 27/10
                                                        407/11
6,312,199 B1 * 11/2001 Sjoden .................... B23B 27/10
                                                        407/11
(Continued)

FOREIGN PATENT DOCUMENTS

DE    102009060046 A1 *  6/2011  ............. B23B 27/10
JP         08071813 A  *  3/1996
(Continued)

*Primary Examiner* — Daniel Howell
*Assistant Examiner* — Nicole N Ramos
(74) *Attorney, Agent, or Firm* — ScienBiziP, P.C.

(57) ABSTRACT

The present disclosure provides a machining equipment which includes a seat, a plurality of electrodes, and a machining assembly assembled on the seat. The machining assembly includes a pole mounted on the seat, a machining tool mounted on the pole, and two protrusions formed on the pole. The pole defines a channel. Each protrusion defines an opening communicated with the channel. The two openings of the two protrusions face the machining tool.

19 Claims, 13 Drawing Sheets

(56) References Cited

U.S. PATENT DOCUMENTS

| | | | |
|---|---|---|---|
| 6,443,672 B1* | 9/2002 | Lagerberg | B23B 27/10 407/11 |
| 6,471,448 B1* | 10/2002 | Lagerberg | B23Q 11/005 407/11 |
| 7,059,809 B2* | 6/2006 | Oettle | B23B 27/007 407/11 |
| 7,063,487 B2* | 6/2006 | Hessman | B23B 27/06 407/103 |
| 2002/0127067 A1 | 9/2002 | Lagerberg | |
| 2008/0124180 A1* | 5/2008 | Breisch | B23B 27/10 407/110 |

FOREIGN PATENT DOCUMENTS

| | | | | |
|---|---|---|---|---|
| JP | 2010105084 A | * | 5/2010 | |
| JP | 2013226618 A | * | 11/2013 | |
| WO | WO 2008066473 A1 | * | 6/2008 | B23B 27/04 |

* cited by examiner

MACHINING EQUIPMENT

CROSS-REFERENCE TO RELATED APPLICATIONS

This application claims priority to Chinese patent application no. 201410585851.7, filed on Oct. 28, 2015, the contents of which are incorporated by reference herein.

FIELD

The subject matter generally relates to a machining equipment.

BACKGROUND

When a cutting tool is used for cutting a workpiece, the cutting tool always generates heat. Thus, a cooler device is necessary to the cutting tool.

BRIEF DESCRIPTION OF THE DRAWINGS

Implementations of the present technology will now be described, by way of example only, with reference to the attached figures.

DETAILED DESCRIPTION

Figure 1:
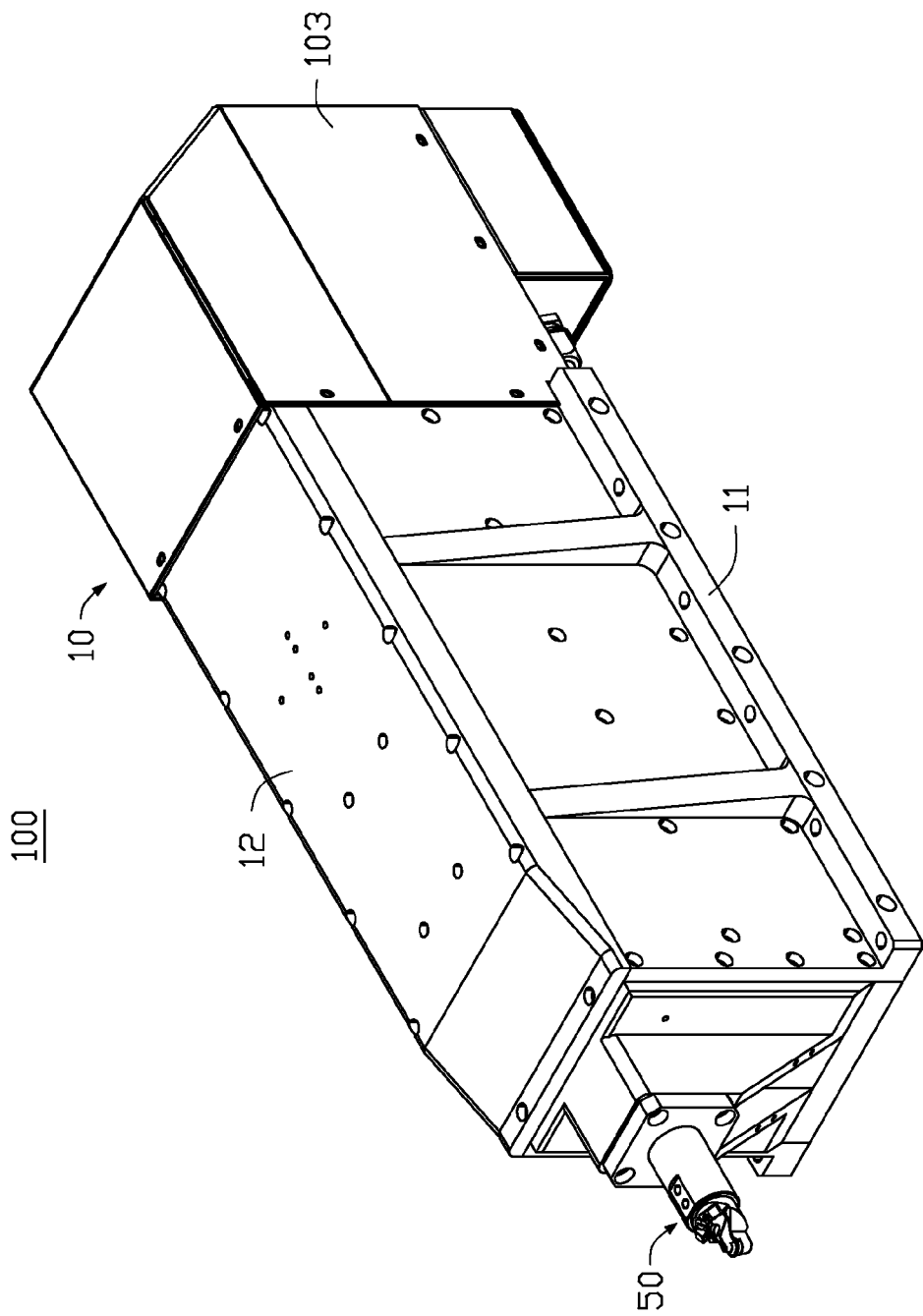
FIG. 1 is an isometric view of a machining equipment in accordance with an exemplary embodiment of the present disclosure.

It will be appreciated that for simplicity and clarity of illustration, where appropriate, reference numerals have been repeated among the different figures to indicate corresponding or analogous elements. In addition, numerous specific details are set fourth in order to provide a thorough understanding of the exemplary embodiments described herein. However, it will be understood by those of ordinary skill in the art that the exemplary embodiments described herein can be practiced without these specific details. In other instances, methods, procedures and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

A definition that applies throughout this disclosure will now be presented.

The term "comprising," when utilized, means "including, but not necessarily limited to"; it specifically indicates open-ended inclusion or membership in the so-described combination, group, series and the like.

The present disclosure is described in relation to a machining equipment.

FIG. 1 illustrates a machining equipment 100 including a seat 10. The seat 10 includes a first plate 11 and a second plate 12 opposite to the first plate 11, and a casing 13 mounted at an end of the seat 10. A machining assembly 50 is assembled at the other end of the seat 10.

Figure 2:
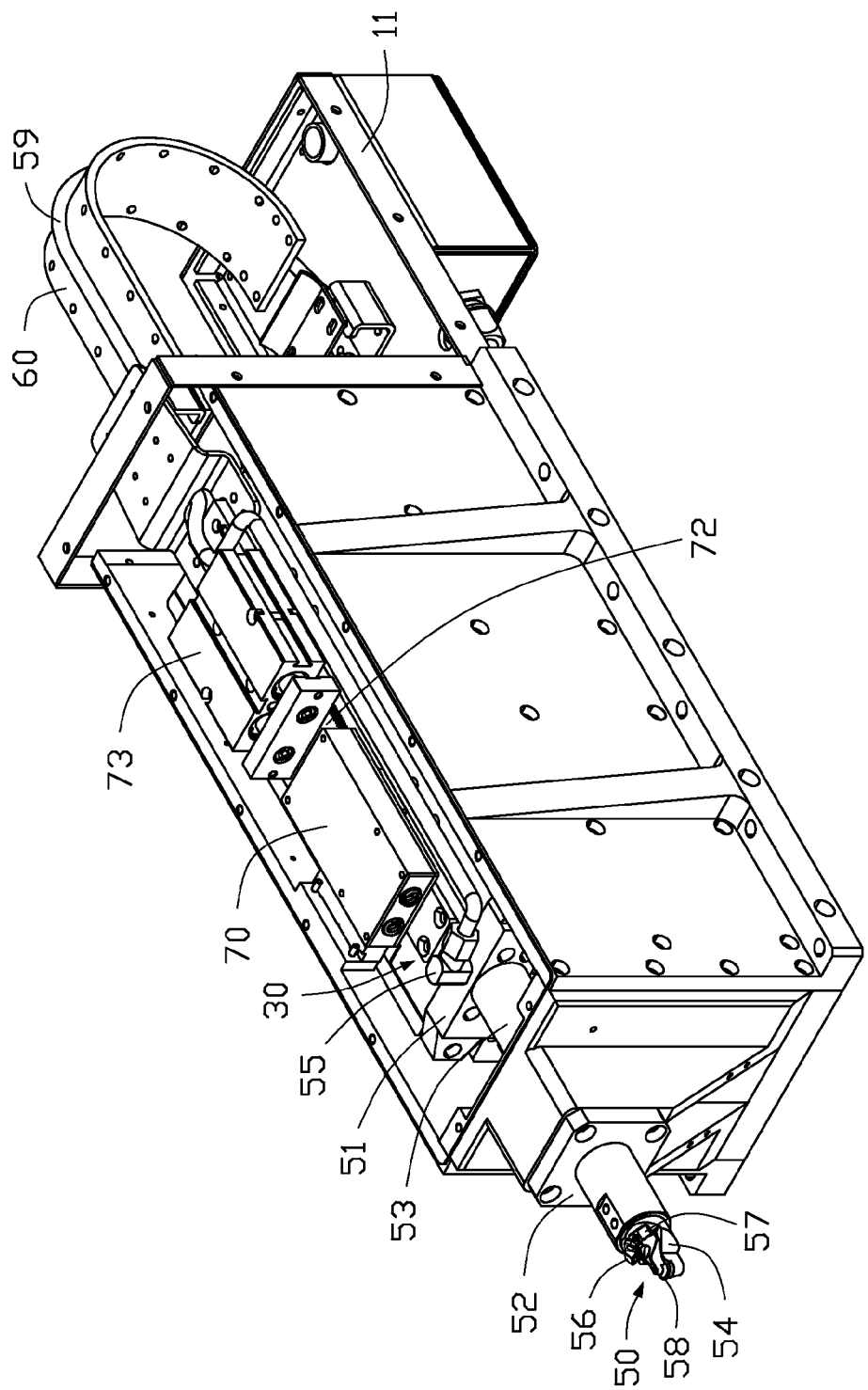
FIG. 2 is an isometric view of part of the machining equipment in FIG. 1.

FIG. 2 illustrates the machining equipment 100, wherein the first plate 11 and the 13 is omitted. The machining equipment 100 further includes a sliding assembly 30 and a detent assembly 70. The sliding assembly 30 and the detent assembly 70 are located inside the seat 10. A portion of the machining assembly 50 protrudes out of the seat 10 and is configured for processing a workpiece. The machining assembly 50 is assembled on the sliding assembly 30 and the sliding assembly 30 can drives the machining assembly 50 to move. The detent assembly 70 is assembled on the sliding assembly 30 to apply the brake to the sliding assembly 30. In the illustrated embodiment, the machining equipment 100 is a turning machine and is configured for turning the workpiece. Alternatively, the machining equipment 100 can be a milling or grinding machine. The machining assembly 50 includes a bar 51, a sleeve 52, a pipe 53, a pole 54, a liquid ingoing head 55, a first liquid outgoing head 56, a second liquid outgoing head 57 and a machining tool 58. Alternatively, the first liquid outgoing head 56 and the second liquid outgoing head 57 are not limited as two. The bar 51 is mounted on the setting element 39 with a side attached on the setting element 39.

A tube 59 extends into the seat 10 from an outer side of the first plate 11 opposite from the machining assembly 50 and is communicated with the liquid ingoing head 55. The machining equipment 100 further includes a sheet 60. The sheet 60 is substantially a "J" shape. An end of the sheet 60 is fixed onto the sliding assembly 30. In the illustrated embodiment, the tube 59 is inserted into the seat 10 through a hole (not shown) defined in the first plate 11 and extends along the sheet 60 to communicated with the liquid ingoing head 55.

Figure 3:
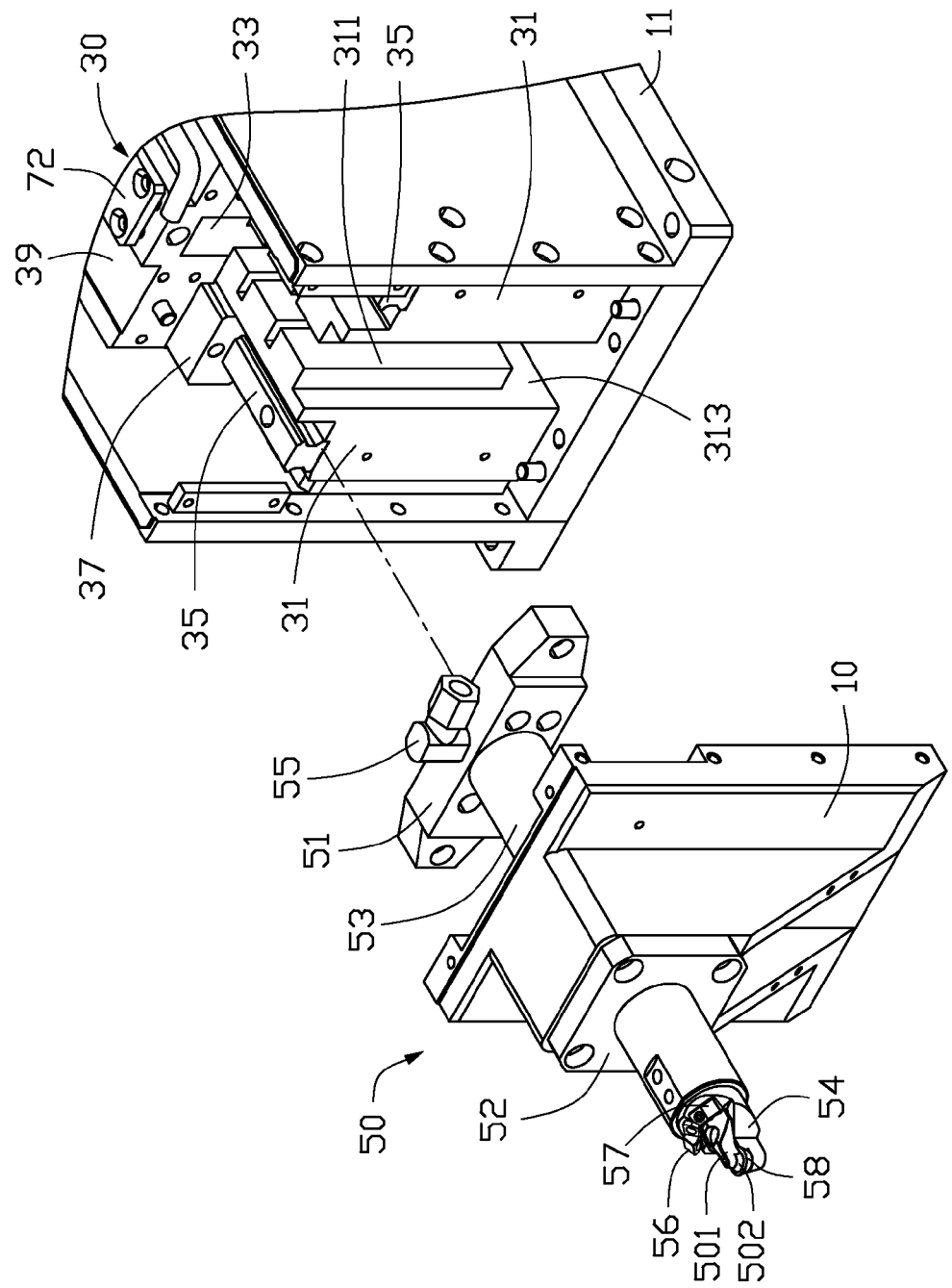
FIG. 3 is an exploded, isometric view of part of the machining equipment in FIG. 1.

Please also referring to FIG. 3, FIG. 3 illustrates an exploded, isometric view of part of the machining equipment machining equipment 100. The sliding assembly 30 includes two stators 31, a rotor 33, two rails 35, two slip elements 37 and a setting element 39. Each stator 31 is mounted on the first plate 11 of the seat 10 perpendicularly. The two stators 31 are parallel to each other and spaced from each other. A plurality of magnets 311 are mounted on a surface of each stator 31 facing the other stator 31. The magnets 311 are spaced from each other with the same distance. The magnets 311 mounted on the two stators 31 define a passage 313 therebetween. The rotor 33 is configured as an "I" shape. Each of the two rails 35 is mounted on a corresponding stator 31 away from the first plate 11, respectively. The two rails 35 are parallel to each other. The slip elements 37 are slidably mounted on the rails 35, respectively. The slip elements 37 are parallel to each other. The setting element 39 is substantially plate-shaped. The setting element 39 is fixed on the rotor 33 and the setting element 39 is located beside the two slip elements 37 and away from the rail 35.

Figure 4:
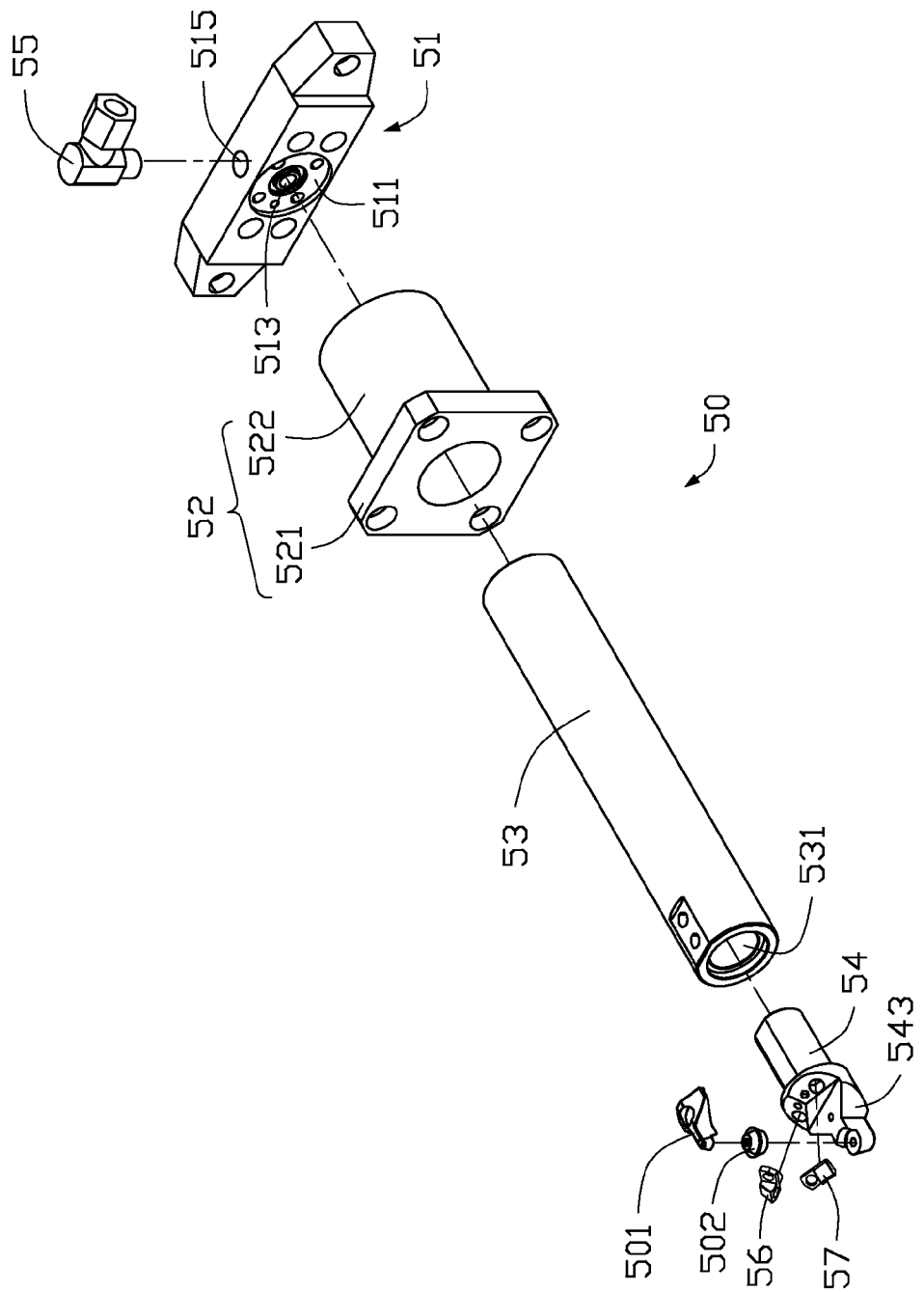
FIG. 4 is an exploded, isometric view of the machining equipment in FIG. 1, wherein a channel is omitted.

Please also referring to FIG. 4, FIG. 4 illustrates an exploded, isometric view of the machining assembly 50. The bar 51 is substantially a rectangular plate. A recess 511 is defined on the other side of the bar 51 away from the setting element 39. The recess 511 is recessed towards the setting element 39. A first hole 513 is defined in bottom of the recess 511 and penetrates the bar 51. A second hole 515 is defined on the bar 51 with a central axis crossing the first hole 513 perpendicularly. The liquid ingoing head 55 is fixed in the second hole 515 and is communicated with the second hole 515. A cross section view of the sleeve 52 is a hollow "T" shape. The sleeve 52 includes aboard 521 and a post 522. The post 522 is formed on a center of the board 521. A hole penetrates the board 521 and the post 522 in the center thereof. The board 521 is fixed on a front surface of the 10, and the post 522 penetrates through the front surface of the seat 10 into the inside of the seat 10. A central axis of the sleeve 52 overlaps that of the bar 51. The pipe 53 is substantially a shaft shape. An end of the pipe 53 is received in the recess 511 to be fixed on the bar 51. The other end of the pipe 53 penetrates through the sleeve 52 slidably and protrudes out of the seat 10. The pipe 53 defines a through hole 531 along the central axis thereof. The through hole 531 is communicated with the channel 5411 of the pole 54.

Figure 5:
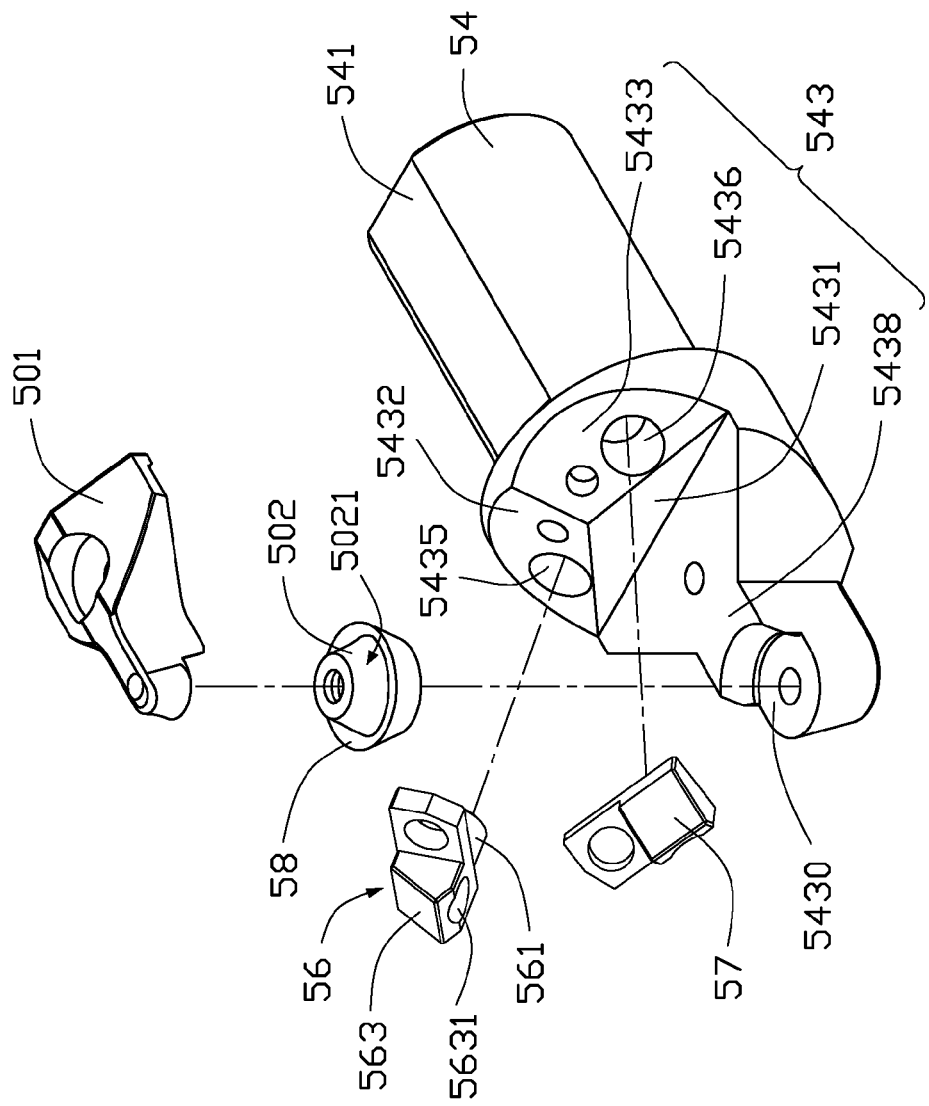
FIG. 5 is an enlarged isometric view of the machining assembly in FIG. 4, wherein a channel, a pipe, a sleeve and a liquid ingoing head are omitted.
Figure 6:
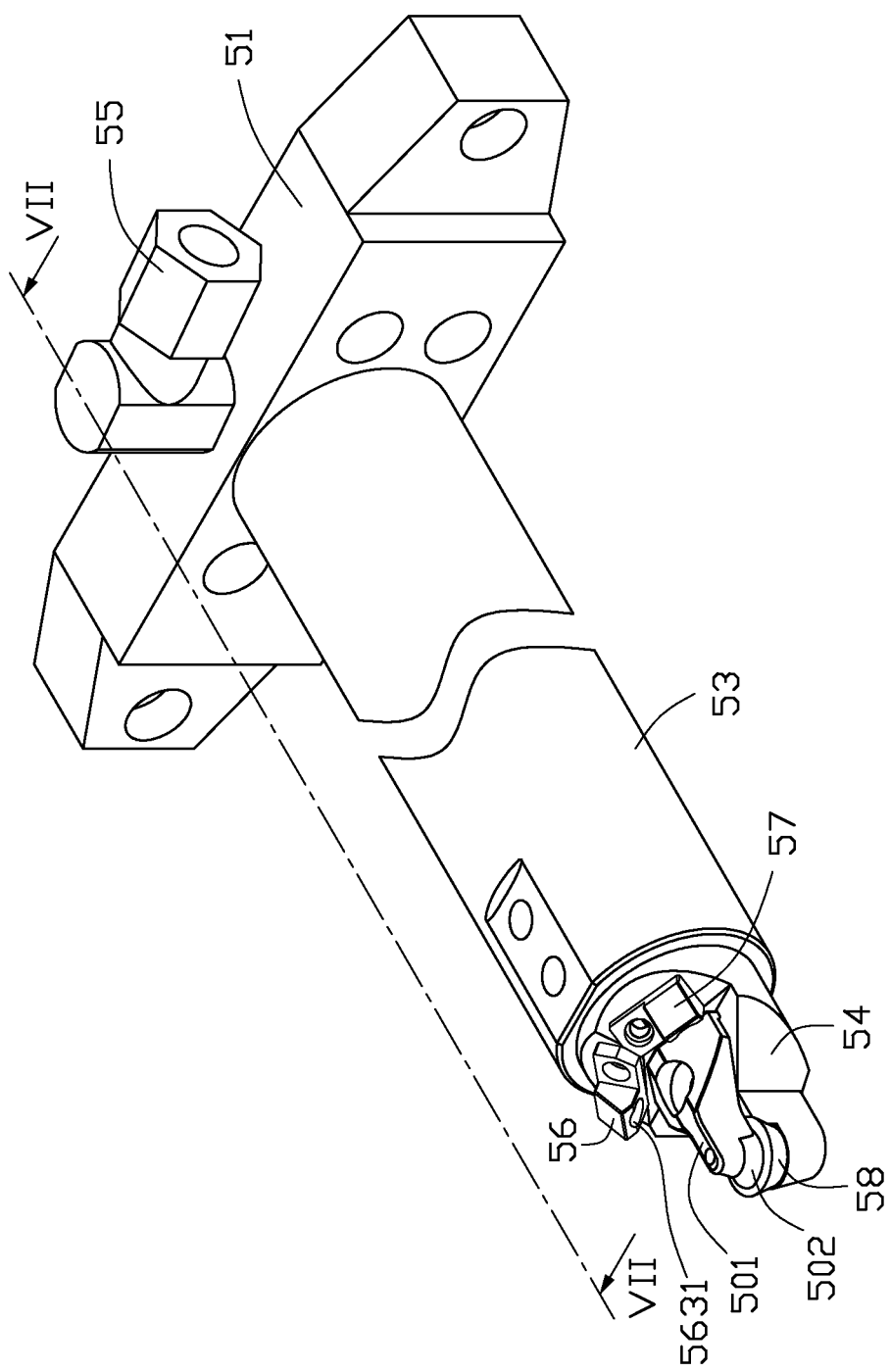
FIG. 6 is an isometric view of the machining assembly in FIG. 4, wherein the channel and the sleeve are omitted.
Figure 7:
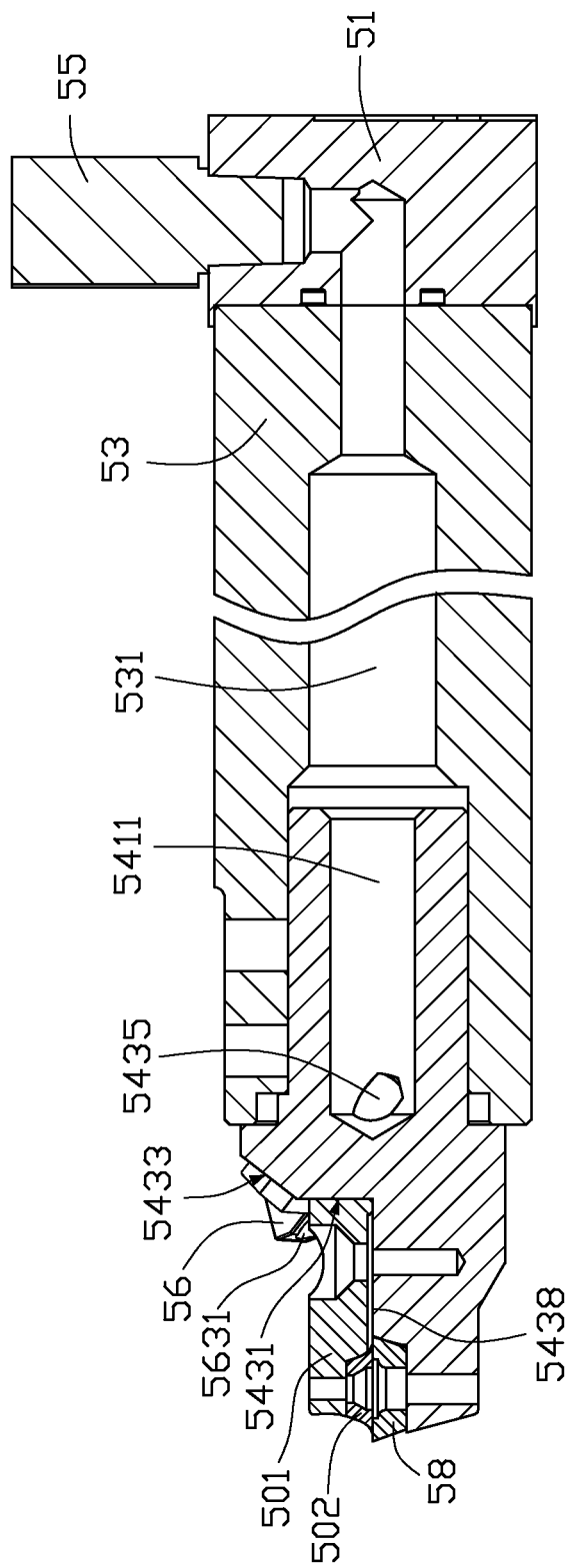
FIG. 7 is a cross-section view of the machining assembly in FIG. 6 along a line VII-VII.
Figure 8:
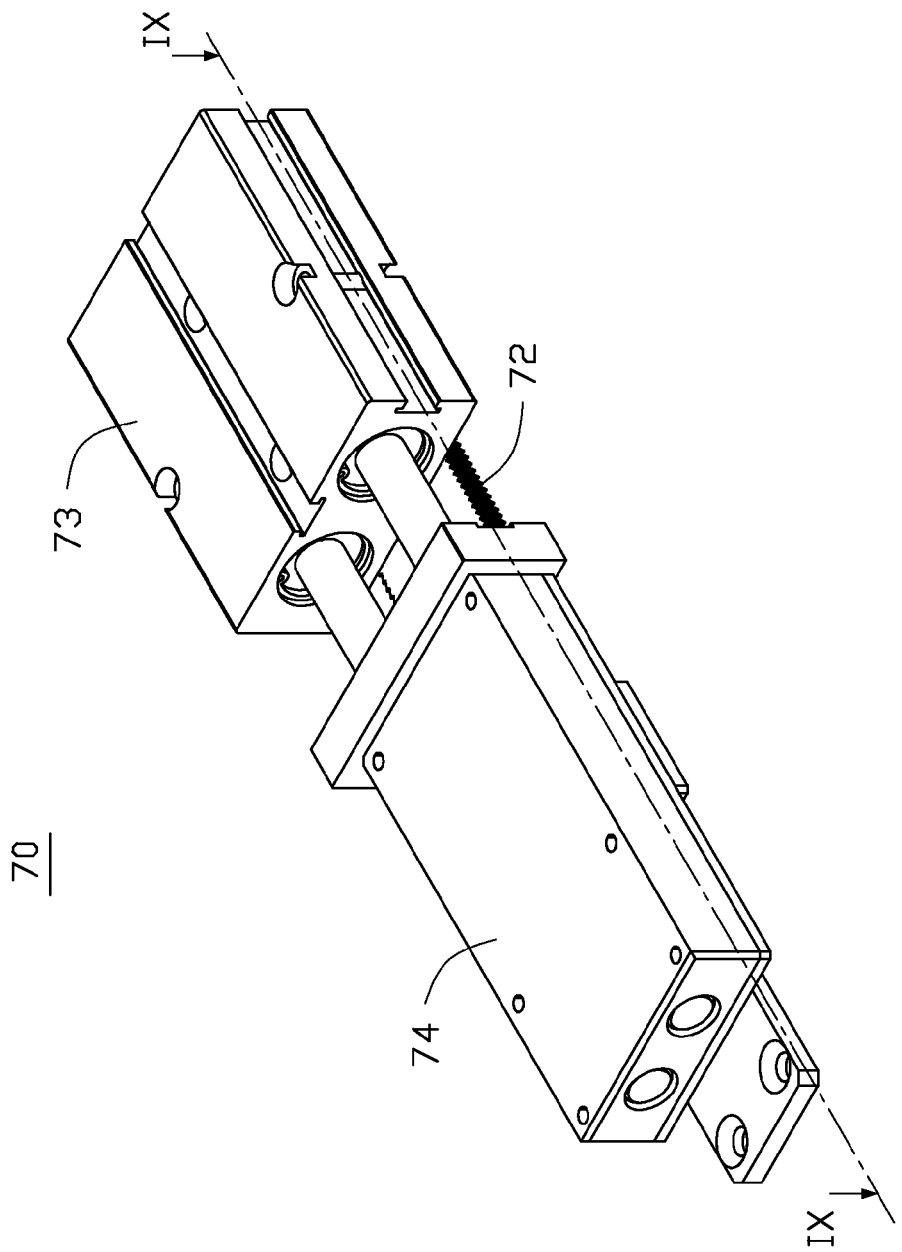
FIG. 8 is an isometric view of a detent assembly in the machining assembly in FIG. 1.

Please also referring to FIGS. 5, 6 and 7, the pole 54 includes a body 541 and a wedge 543 mounted on the body 541. The body 541 is received in the hole 531 of the pipe 53 to fix the pole 54 onto the pipe 53. The body 541 defines a channel 5411 along an axis thereof. The axis of the channel 5411 overlaps the axis of the pipe 531. The wedge 543 includes a connecting surface 5431, a first cuneate surface 5432, a second cuneate surface 5433 and a horizontal surface 5438. The horizontal surface 5438 is parallel to the axis of the body 541. The connecting surface 5431 is perpendicular to the axis of the body 541 and the horizontal surface 5438. The connecting surface 5431 is connected with the horizontal surface 5438, the first cuneate surface 5432 and the second cuneate surface 5433. The connecting surface 5431 is located between the horizontal surface 5438 and the first cuneate surface 5432. An angle between the first cuneate surface 5432 and the connecting surface 5431 is an obtuse angle. In other words, the angle is larger than 90° and less than 180°. The first cuneate surface 5432 extends from the connecting surface 5431 away from the horizontal surface 5438. An angle between the second cuneate surface 5433 and the connecting surface 5431 is an obtuse angle. The second cuneate surface 5433 extends from the connecting surface 5431 away from the horizontal surface 5438. An angle between the first cuneate surface 5432 and the second cuneate surface 5433 is an obtuse angle. A first receiving hole 5435 is defined on the first cuneate surface 5432. The first receiving hole 5435 is communicated with the channel 5411. A second receiving hole 5436 is defined on the second cuneate surface 5433. The second receiving hole 5436 is communicated with the channel 5411. The horizontal surface 5438 recesses at an end thereof to define a stage 5430 away from the connecting surface 5431.

The first liquid outgoing head 56 and the second liquid outgoing head 57 are assembled on the pole 5432 and the second cuneate surface 5433 respectively. In the illustrated embodiment, the first liquid outgoing head 56 has the same structure with the second liquid outgoing head 57. Thus, a detail description of the first liquid outgoing head 56 is given below. The first liquid outgoing head 56 includes a column 561 and a protrusion 563 protruding at an opposite side of the column 561. The column 561 is substantially a tube with a through hole (not shown) defined therein. A protrusion 5631 is defined in the protrusion 563 and is communicated with the through hole of the column 561. The column 561 of the first liquid outgoing head 56 is inserted into the first receiving hole 5435 to fix the first liquid outgoing head 56 onto the pole 5432. The axis of the through hole of the first liquid outgoing head 56 overlaps the axis of the first receiving hole 5435. The protrusion 5631 of the first liquid outgoing head 56 is communicated with the first receiving hole 5435. The protrusion 5631 of the first liquid outgoing head 56 faces towards the stage 5430 of the pole 54. The column 561 of the second liquid outgoing head 57 is inserted into the second receiving hole 5436 to fix the second liquid outgoing head 57 onto the second cuneate surface 5433. The axis of the through hole of the second liquid outgoing head 57 overlaps the axis of the second receiving hole 5436. The protrusion 5631 of the second liquid outgoing head 57 is communicated with the second receiving hole 5436. The protrusion 5631 of the second liquid outgoing head 57 faces towards the stage 5430.

The machining tool 58 is fixed on the stage 5430. The first liquid outgoing head 56 and the second liquid outgoing head 57 are located at two sides of the machining tool 58. The protrusion 5631 of the first liquid outgoing head 56 and the second liquid outgoing head 57 face the machining tool 58. In the illustrated embodiment, the machining tool 58 is a cutting tool of the turning machine.

The machining assembly 50 further includes a lid 501 and a frustum 502. The lid 501 is supported on the horizontal surface 5438. The frustum 502 is fixed on the lid 501 and faces the stage 5430. The frustum 502 is located between the machining tool 58 and the lid 501. The frustum 502 is supported on the machining tool 58. The frustum 502 is substantially a cone with a head cut out. A diameter of the frustum 502 adjacent to the machining tool 58 is less than a diameter of the machining tool 58 adjacent to the frustum 502. The frustum 502 has a cutting surface 5021 on periphery side thereof. The cutting surface 5021 is configured for rupturing scraps generated from the turning process on the machining tool 58.

Please referring to FIGS. 2, 3, 8 and 9, the detent assembly 70 includes a rack 72, a housing 74, a support 75, a resetting portion 76, a arrester 77 and a elastic element 79. The rack 72 is fixed on the sliding assembly 30. The housing 74 is supported on the rack 72. The support 75 is slidably mounted in the housing 74. Two ends of the resetting portion 76 respectively abut the support 75 and an inner wall of the housing 74. The arrester 77 is slidably mounted in the housing 74. The arrester 77 can mesh with the rack 72 to make the setting element 39 and the rotor 33 stop turning when the electricity fails. The elastic element 79 is located between the support 75 and the arrester 77. The elastic element 79 and the resetting portion 76 are located by two sides of the arrester 77.

The rack 72 is fixed on the setting element 39 of the sliding assembly 30. The rack 72 extends along a sliding direction of the rotor 33. The rack 72 has tooth at two lateral sides thereof. The detent assembly 70 further includes a driver 73 to drive the support 75 to move with respect to the housing 74. Please also referring to FIG. 10, the driver 73 is located at a side of the housing 74 and adjacent to the elastic element 79. In the illustrated embodiment, the driver 73 is a cylinder.

Please referring to FIG. seat 10 and 11, the housing 74 is substantially rectangular. The housing 74 includes a base 742 and a cover 744 covering on the base 742. The base 742 is fixed on the rack 72 and is spaced from the driver 73. Two slots 746 are defined on the base 742 adjacent to the driver 73. The two slots 746 are spaced from each other and located at two lateral sides of the rack 72 respectively. A baffle 748 is protruded from the base 742 away from the rack 72. The baffle 748 is located between the resetting portion 76 and the arrester 77 to limit the arrester 77. Please also referring to FIG. 12, the cover 744 recesses towards the driver 73 to define a cavity 7442. The cavity 7442 is configured for receiving the support 75. The cavity 7442 defines an inserting hole 7445 at a sidewall adjacent to the driver 73. The inserting hole 7445 is communicated with the cavity 7442. The cavity 7442 defines a hole 7446 at a sidewall away from the driver 73 along the sliding direction of the rotor 33. The hole 7446 is configured for receiving the resetting portion 76. In the embodiment, there are two holes 7446. The holes 7446 are opposite to each other and spaced from each other to penetrate the sidewall of the cavity 7442 away from the driver 73.

Figure 12:
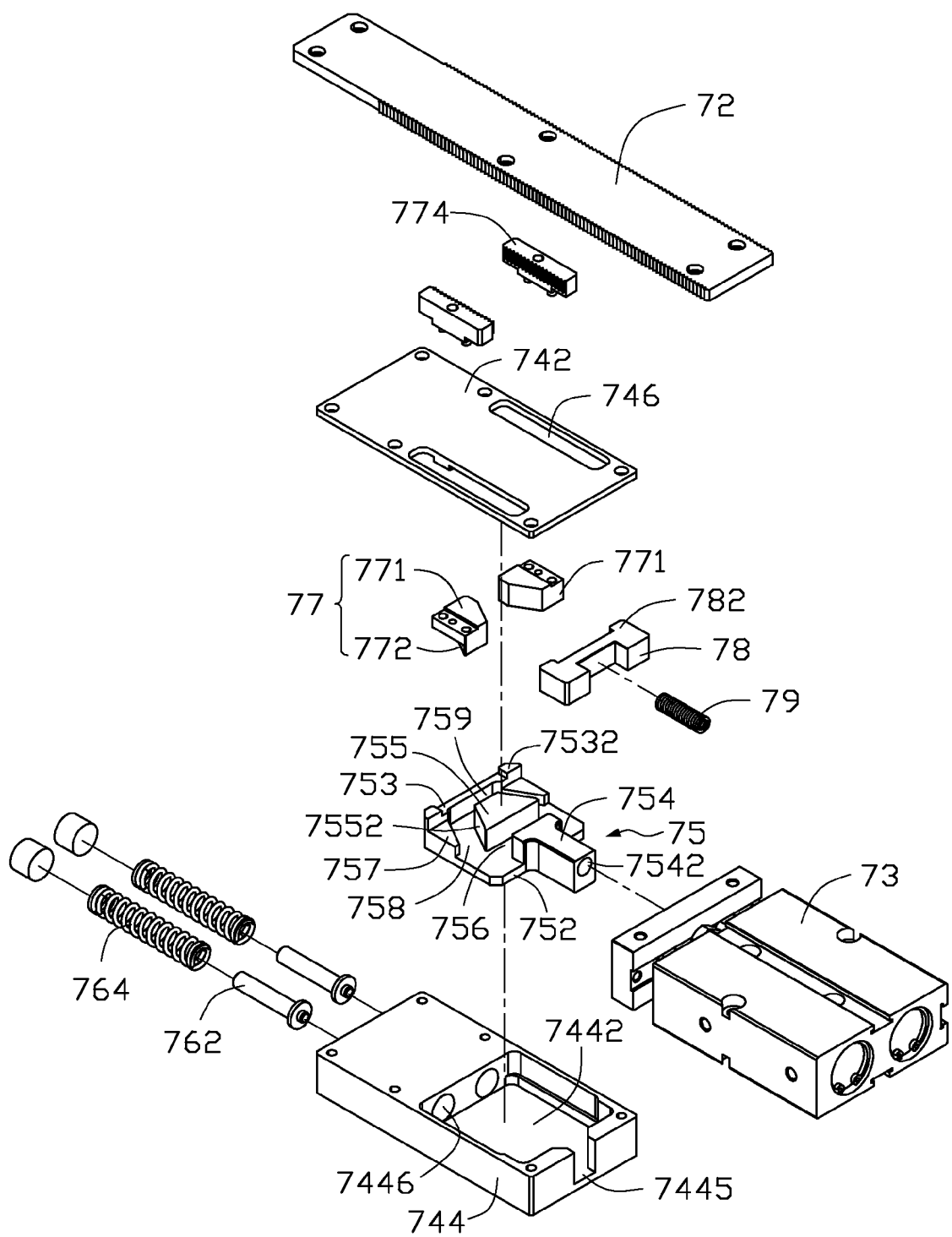
FIG. 12 is an exploded, isometric view of the detent assembly in FIG. 11 from an invert view.
Figure 13:
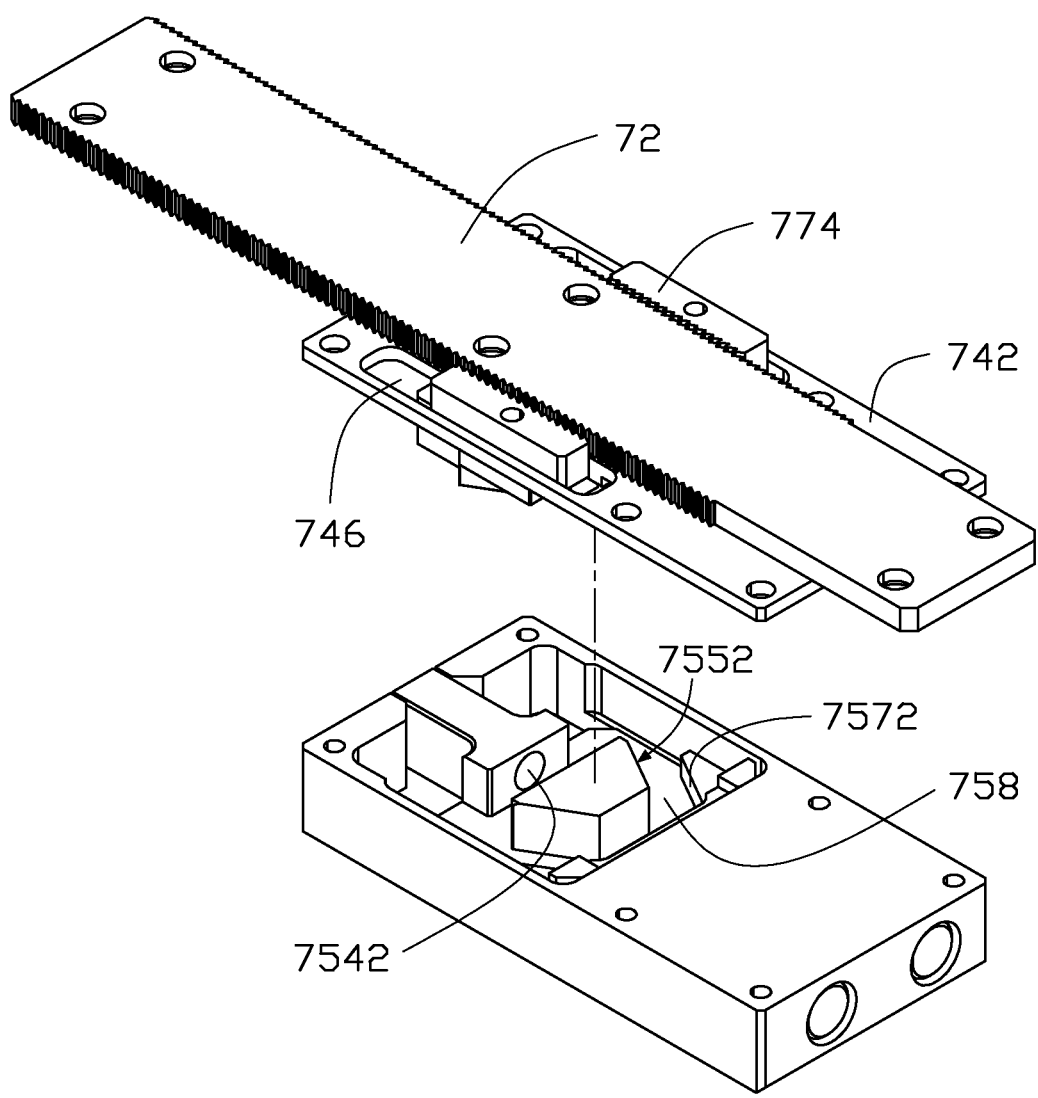
FIG. 13 is a partly exploded, isometric view of the detent assembly in FIG. 10 from an invert view.

Please referring to FIGS. 12 and 13, the support 75 includes a plank 752, and a front plate 753, a rear pole 754, an extension 755 and a side plate 757 formed on the plank 752 towards the rack 72 and spaced from each other. The front plate 753 is formed on an end of the plank 752 away from the driver 73. The front plate 753 forms two tines 7532 on a surface away from the rack 72. The rear pole 754 is substantially a " 凸 " shape. The rear pole 754 is located on an end of the plank 752 away from the front plate 753. An end of the rear pole 754 away from the front plate 753 can penetrate through the inserting hole 7445 of the cover 744. The rear pole 754 defines a hole 7542 along the sliding direction of the rotor 33. The extension 755 is substantially a trapeziform shape. The extension 755 is protruded at a central portion of the plank 752. The extension 755 has two inclined surfaces 7552. A distance between the two inclined surfaces 7552 reduces gradually along a direction away from the driver 73. The extension 755 and the rear pole 754 define a sliding space 756 therebetween. The side plate 757 each are formed on a lateral side of the front plate 753 and towards the rear pole 754. The side plate 757 has two inclined sidewalls 7572 corresponding to the inclined surfaces 7552. Each inclined sidewall 7572 is parallel to and spaced from a corresponding inclined surface 7552 to define a guiding passage 758 therebetween. The guiding passage 758 is communicated with the sliding space 756. The front plate 753 defines a groove 759 between the front plate 753 and a sidewall of the extension 755 away from the driver 73. The groove 759 is communicated with the guiding passage 758.

Figure 11:
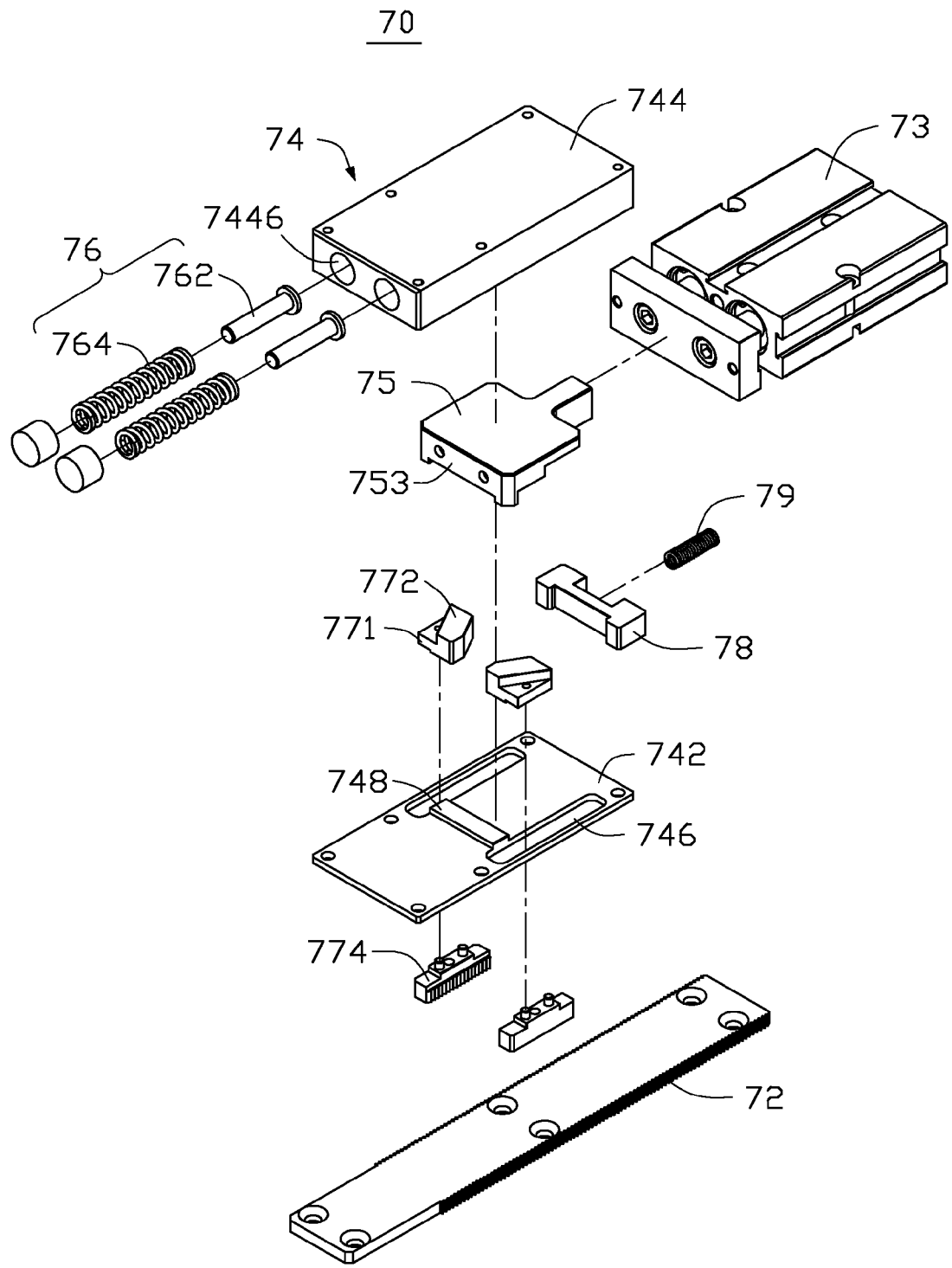
FIG. 11 is an exploded, isometric view of the detent assembly in FIG. 8.

Please referring to FIGS. 9 and 11 again, in the illustrated embodiment, there are two reset assemblies 76. Each reset assembly 76 is received in a corresponding hole 7446. The resetting portion 76 includes a shaft 762 and a reset portion 764. An end of the shaft 762 is fixed on the front plate 753 of the support 75. In the illustrated embodiment, the reset portion 764 is a spring. A length of the reset portion 764 is larger than a length of the shaft 762. The reset portion 764 is sleeved on the shaft 762 with two ends abutting the front plate 753 of the support 75 and an end of the hole 7446 away from the driver 73.

The arrester 77 includes a sliding body 771, a guiding block 772 formed on the sliding body 771 and a meshing portion 774 mounted on the sliding body 771. The guiding block 772 extends from the sliding body 771 towards the support 75. The guiding block 772 is responding to the guiding passage 758. The guiding block 772 is slidably received in the guiding passage 758. The meshing portion 774 is coupled on the sliding body 771 and penetrates through the slot 746 slidably. The meshing portion 774 has tooth coupled with the rack 72. When the guiding block 772 moves along the guiding passage 758 away from the driver 73, the meshing portion 774 moves in the slot 746 to mesh with the rack 72, thereby limiting a movement between the setting element 39 and the rotor 33. When the guiding block 772 moves along the guiding passage 758 towards the driver 73, the meshing portion 774 moves in the slot 746 away from the rack 72 to dis-mesh with the rack 72, thereby maintaining the movement between the setting element 39 and the rotor 33.

Figure 9:
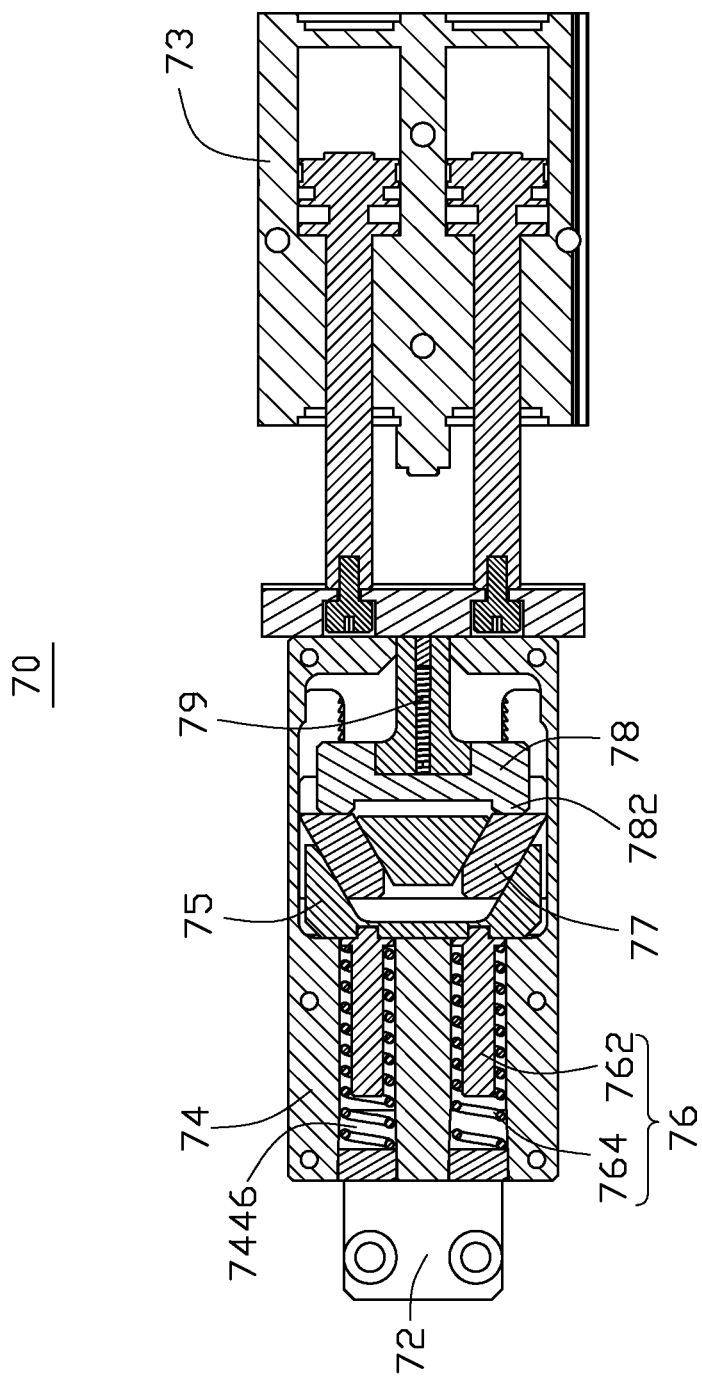
FIG. 9 is a cross-section view of the detent assembly in FIG. 8 along a line IX-IX.
Figure 10:
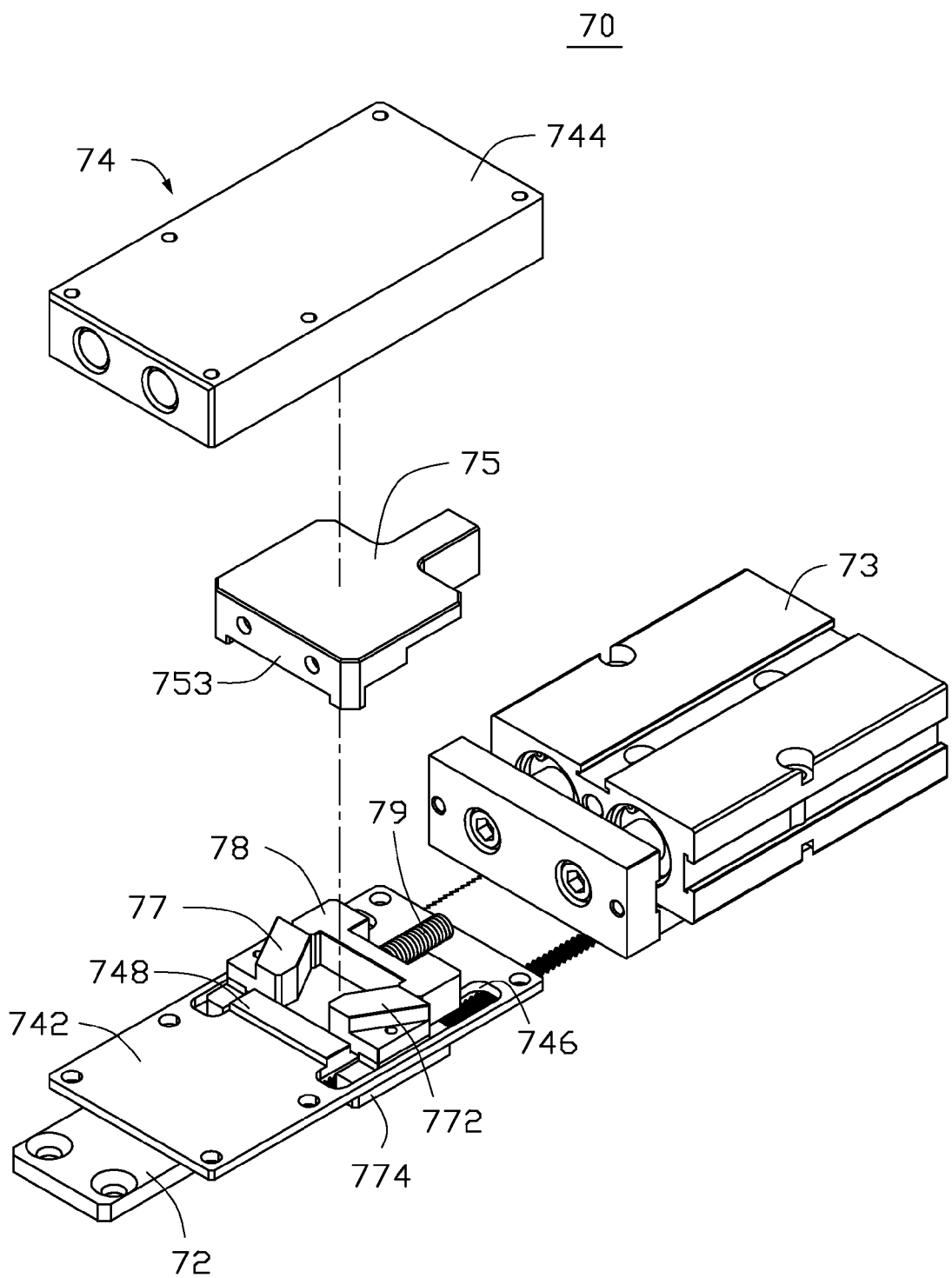
FIG. 10 is a partly exploded, isometric view of the detent assembly in FIG. 8.

Please referring to FIGS. 9, 10 and 12, in the illustrated embodiment, the elastic element 79 is received in the support 7542 of the rear pole 754 and is located between the support 75 and the arrester 77. The detent assembly 70 further includes a block 78. The block 78 is mounted on the sliding space 756 slidably and is located between the elastic element 79 and the arrester 77. Two ends of the elastic element 79 abut against the block 78 and the support 75 respectively. Two holding portions 782 are formed on the block 78 protruding towards the front plate 753. The two holding portions 782 are spaced from each other. Each holding portion 782 abuts the guiding block 772 of the arrester 77 and the sliding body 771 at two opposite sides.

When the machining equipment 100 is assembled, please referring to FIG. 3 again, the two stators 31 are fixed in the seat 10 in parallel. Each of the two rails 35 is fixed on a corresponding 31. The rotor 33 is slidably mounted between the two stators 31. The slip element 37 with the setting element 39 mounted thereon is slidably fixed on a corresponding 35. The bar 51 with the liquid ingoing head 55 mounted thereon is fixed onto the setting element 39. The sleeve 52 is fixed onto the seat 10. One end of the pipe 53 is slidably penetrated through the sleeve 52 to expose out of the 10, the other end of the pipe 53 is fixed onto the bar 51. The pole 54 is fixed onto the pipe 53 and the machining tool 58 is fixed on the pole 54. The first liquid outgoing head 56 and the second liquid outgoing head 57 are fixed onto the pole 54, and the protrusion 5631 of the first liquid outgoing head 56 and the second liquid outgoing head 57 face the machining tool 58 laterally. The lid 501 with the frustum 502 mounted thereon is fixed onto the pole 54.

When the detent assembly 70 is assembled, please referring to FIGS. 9-12 again, the support 75 is slidably received in the housing 744, and the resetting portion 76 is received in the hole 7446. The elastic element 79 is received in the support 7542 of the rear pole 754. The block 78 is slidably mounted in the sliding space 756. The guiding block 772 of the arrester 77 is slidably received in the guiding passage 758. The base 742 and the sliding body 771 are mounted on the base 742 at two opposite sides. The meshing portion 774 is slidably penetrated through the slot 746 of the base 742. The base 742 and the driver 73 are fixed on the rack 72 and spaced from each other. The rack 72 is fixed onto the setting element 39 and extends along the direction of the rotor 33.

When the machining equipment 100 is used, one end of the tube 59 is communicated with the liquid ingoing head 55, and the other end of the tube 59 is communicated with cooling liquid. Power is supplied on the two stators 31. The rotor 33 will slide along the passage 313 under electromagnetic induction principle. The rotor 33 drives the setting element 39 to move and also drives the two slip elements 37 to slide on the rail 35. Meanwhile, the driver 73 is connected to the housing 74 to limit a movement of the support 75 with respect to the housing 74 towards the resetting portion 76. Here, the resetting portion 76 is in compression. When the support 75 moves to a predetermined position with respect to the housing 74, the baffle 748 of the housing 74 slide in the groove 759 from two tines 7532 therebetween to abut the arrester 77, thereby limiting a movement of the arrester 77 along with the support 75. The support 75 continues to move towards the resetting portion 76 under a drive of the driver 73. Here, the arrester 77 moves along the guiding passage 758 of the support 75 away from the resetting portion 76 to make the meshing portion 774 of the arrester 77 away from the rack 72, thereby smoothing the glide between the setting element 39 and the rotor 33. In addition, the arrester 77 can press the elastic element 79 when the arrester 77 moves along the guiding passage 758 of the support 75 away from the resetting portion 76. The setting element 39 drives the machining assembly 50 under the drive of the rotor 33 to machining the workpiece with the machining tool 58. In the above machining process, the cooling liquid enters into the liquid ingoing head 55 to flow to the protrusion 5631 of the first liquid outgoing head 56 and the protrusion 5631 of the second liquid outgoing head 57 through the pipe 531 continuously and gush over the machining tool 58 to cool the machining tool 58 sufficiently.

When the electricity fails for the machining equipment 100, the driver 73 stops to work. The resetting portion 76 forces the support 75 to move towards the driver 73 under elastic recovery, meanwhile, the arrester 77 is forced to move along the guiding passage 758 towards the resetting portion 76. The meshing portion 774 of the arrester 77 moves towards the rack 72 to mesh with the rack 72, thereby limiting the movement between the setting element 39 and the rotor 33. When the resetting portion 76 drives the arrester 77 to move towards the driver 73 along with the support 75, the setting element 39 and the rotor 33 are driven to move towards the driver 73 and away from the workpiece.

It is to be further understood that even though numerous characteristics and advantages have been set forth in the foregoing description of exemplary embodiments, together with details of the structures and functions of the exemplary embodiments, the disclosure is illustrative only; and that changes may be made in detail, according in matters of shape, size, and arrangement of parts within the principles of the disclosure to the full extent indicated by the broad general meaning of the terms in which the appended claims are expressed.

The exemplary embodiments shown and described above are only examples. Many details are often found in the art such as the other features of the LED element. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the exemplary embodiments described above may be modified within the scope of the claims.

What is claimed is:

1. A machining equipment comprising:
   a seat; and
   a machining assembly assembled on the seat, the machining assembly comprising:
   a pole comprising a body mounted on the seat and a wedge mounted on the body, wherein the body defines a channel along an axis thereof, and the wedge defines a first receiving hole and a second receiving hole communicating with the channel;
   a machining tool mounted on the wedge; and
   two protrusions mounted on the wedge, each protrusion defining an opening, the two openings respectively communicating with the first receiving hole and the second receiving hole, and the two openings of the two protrusions facing the machining tool.

2. The machining equipment of claim 1, wherein the machining assembly further comprises two columns, each of the columns is protruded from a corresponding one of the protrusions, one of the columns and the corresponding protrusion form a first liquid outgoing head, the other one of the columns and the corresponding protrusion form a second liquid outgoing head, the column of the first liquid outgoing head is inserted in the first receiving hole, the opening of the protrusion of the first liquid outgoing head is communicated with the first receiving hole, the column of the second liquid outgoing head is inserted in the second receiving hole, and the opening of the protrusion of the second liquid outgoing head is communicated with the second receiving hole.

3. The machining equipment of claim 1, wherein the wedge comprises a first cuneate surface and a second cuneate surface, an angle between the first cuneate surface and the second cuneate surface is an obtuse angle, the first receiving hole is defined on the first cuneate surface, the second receiving hole is defined on the second cuneate surface.

4. The machining equipment of claim 3, wherein the wedge further comprises a connecting surface and a horizontal surface, the connecting surface is perpendicular to the axis of the body and the horizontal surface, the connecting surface is connected with the horizontal surface, the first cuneate surface and the second cuneate surface.

5. The machining equipment of claim 4, wherein the connecting surface is located between the horizontal surface and the first cuneate surface, an angle between the first cuneate surface and the connecting surface is an obtuse angle, an angle between the second cuneate surface and the connecting surface is an obtuse angle.

6. The machining equipment of claim 4, wherein the horizontal surface recesses at an end thereof to define a stage away from the connecting surface, the machining tool is fixed on the stage.

7. The machining equipment of claim 4, wherein the machining equipment further comprises a lid and a frustum, the lid is supported on the horizontal surface, the frustum is fixed on the lid and faces the stage, the frustum is supported on the machining tool, and the frustum has a cutting surface on periphery side thereof.

8. The machining equipment of claim 4, wherein the machining assembly further comprises a sleeve and a pipe, the sleeve is fixed on the seat, the pipe penetrates through the sleeve slidably and protrudes out of the seat, the pipe defines a through hole along a central axis of the pipe to communicate with the channel.

9. The machining equipment of claim 8, wherein the machining assembly further comprises a bar and a liquid ingoing head, the bar is fixed with the pipe, the bar defines a first hole and a second hole therein, the first hole penetrates through the bar along a central axis of the pipe, the second hole extends along a direction perpendicular to the first hole, the liquid ingoing head is fixed in the second hole and is communicated with the second hole.

10. The machining equipment of claim 9, wherein the machining assembly further comprises a tube and a sheet, the sheet is fixed on the seat, and the tube is supported on the sheet, the tube is inserted into the seat and extends along the sheet to communicated with the liquid ingoing head.

11. The machining equipment of claim 10, wherein the machining equipment further comprises a sliding assembly, the bar is connected with the sliding assembly, the sliding assembly comprises two stators, a rotor, two rails, two slip elements and a setting element, the stators are mounted on the seat, the rotor is located between the two stators, each of the two rails is mounted on a corresponding stator, the slip elements are slidably mounted on the rails respectively, the setting element is connected to the pole.

12. The machining equipment of claim 11, wherein a plurality of magnets are mounted on a surface of each stator facing the other stator, the magnets mounted on the two stators define a passage therebetween, and the rotor is slidably received in the passage.

13. The machining equipment of claim 11, wherein the machining equipment further comprises a detent assembly, the detent assembly is assembled on the sliding assembly to apply the brake to the sliding assembly.

14. The machining equipment of claim 11, wherein the detent assembly comprises a rack, a housing, a support, a resetting portion, a arrester and a elastic element, the rack is fixed on the sliding assembly, the housing is supported on the rack, the support is slidably mounted in the housing, two ends of the resetting portion respectively abut against the support and an inner wall of the housing, the arrester is slidably mounted in the housing, the arrester meshes with the rack to make the setting element and the rotor stop turning when the electricity fails.

15. The machining equipment of claim 14, wherein the elastic element is located between the support and the arrester, and the elastic element and the resetting portion are located by two sides of the arrester.

16. The machining equipment of claim 14, wherein the rack is fixed on the setting element of the sliding assembly, the rack extends along a sliding direction of the rotor, the rack has tooth at two lateral sides thereof.

17. The machining equipment of claim 14, wherein the support includes a plank, and a front plate, a rear pole, an extension and a side plate formed on the plank towards the rack and spaced from each other, the front plate is formed on an end of the plank, the front plate forms two tines on a surface away from the rack, the rear pole is located on an end of the plank away from the front plate, the rear pole defines a hole along the sliding direction of the rotor, the extension is protruded at a central portion of the plank.

18. The machining equipment of claim 17, wherein the extension has two inclined surfaces, a distance between the two inclined surfaces reduces gradually, the extension and the rear pole define a sliding space therebetween, the side plate each are formed on a lateral side of the front plate and towards the rear pole, the side plate has two inclined sidewalls corresponding to the inclined surfaces, each inclined sidewall is parallel to and spaced from a corresponding inclined surface to define a guiding passage therebetween, the guiding passage is communicated with the sliding space.

19. The machining equipment of claim 18, wherein the front plate defines a groove between the front plate and a sidewall of the extension, the groove is communicated with the guiding passage.

\* \* \* \* \*